United States Patent [19]

Denk

[11] Patent Number: 4,987,674
[45] Date of Patent: Jan. 29, 1991

[54] METHOD OF MAKING A DYNAMOELECTRIC MACHINE WITH SUPERCONDUCTING MAGNET ROTOR

[75] Inventor: Joseph Denk, Manhattan Beach, Calif.

[73] Assignee: Allied-Signal Inc., Morris Township, Morris County, N.J.

[21] Appl. No.: 402,008

[22] Filed: Sep. 1, 1989

Related U.S. Application Data

[63] Continuation-in-part of Ser. No. 217,729, Jul. 7, 1988, Pat. No. 4,908,347.

[51] Int. Cl.$^5$ ............................................. H02K 15/12
[52] U.S. Cl. ....................................... 29/596; 29/598; 29/599; 505/878; 505/924

[58] Field of Search ................... 29/598, 596, 599; 505/876, 877, 878, 924; 310/52, 53, 54, 156

[56] References Cited

U.S. PATENT DOCUMENTS 4,176,291 11/1979 Rabinowitz ..................... 505/878 X Primary Examiner—Carl E. Hall
Attorney, Agent, or Firm—David B. Abel; Terry L. Miller; Robert A. Walsh

[57] ABSTRACT

A dynamoelectric machine having a superconducting magnet rotor and a method of magnetizing the superconducting magnet rotor. The superconducting magnet rotor provides a very strong magnetic field, potentially exceeding the field strength of high energy product permanent magnets.

10 Claims, 3 Drawing Sheets

FIG. 4
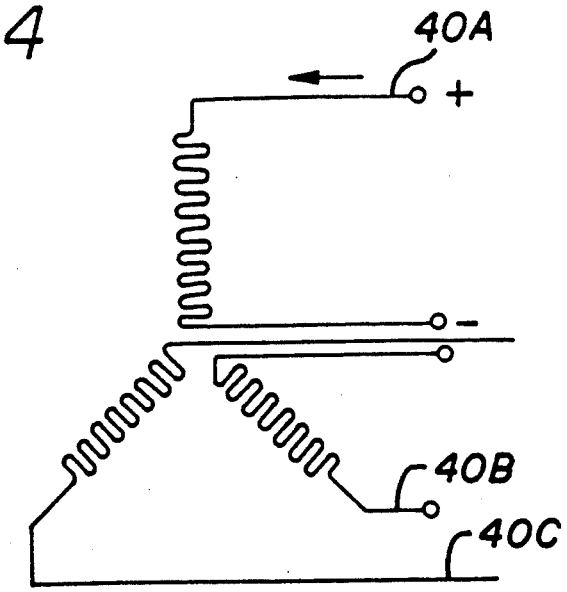
FIG. 5
FIG. 6
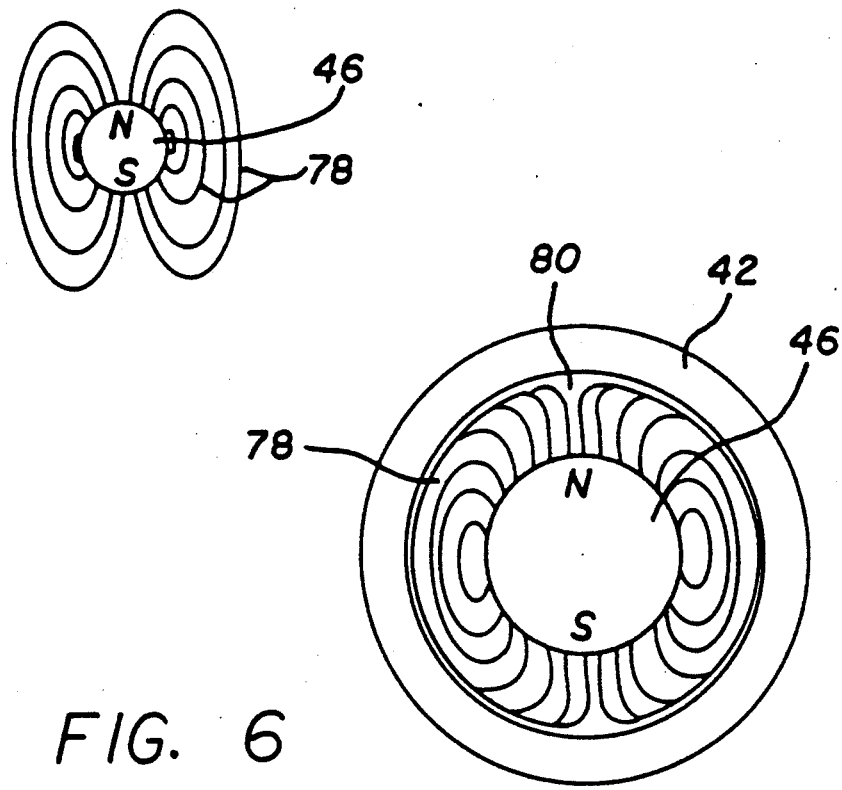

METHOD OF MAKING A DYNAMOELECTRIC MACHINE WITH SUPERCONDUCTING MAGNET ROTOR

The invention was made with Government support under Contract No. N00014-88-C-0668, awarded by the Department of the Navy. The Government has certain rights in this invention.

This is a continuation in part of U.S. patent application Ser. No. 07/217,729 filed July 7, 1988, now U.S. Pat. No. 4,908,347.

BACKGROUND OF THE INVENTION

The present invention relates generally to the construction and configuration of electrical machines including motors and generators. More specifically, the invention relates to an AC electrical machine featuring high output power, increased efficiency, and reduce size as a result of incorporating a diamagnetic rotor assembly having a trapped magnetic field.

Traditionally, AC machines have used either permanent magnet rotors or DC excited wound rotors to produce a rotating magnetic field linking stator windings mounted about the rotor. With the introduction of high magnetic strength permanent magnets, it became possible to build higher power density permanent magnet electrical machines as for example J. Denk, U.S. Pat. No. 4,709,180 herein incorporated by reference. These types of permanent magnet machines make efficient use of permanent magnets having a magnetic energy product up to 45 mega-gauss orsted, which are the strongest magnets presently available. There appears to be an upper limit on the magnetic product available from these new magnetic materials. Thus, the maximum power density for permanent magnet machines making use of the new magnets will also be limited.

It is therefore apparent that in order to significantly improve the power density of electrical machines of this type, the magnetic energy product of the rotor must be significantly increased.

BRIEF DESCRIPTION OF THE INVENTION

The invention incorporates a solid cylinder of superconducting diamagnetic material within the rotor assembly of a dynamoelectric machine. The diamagnetic material has a critical temperature Tc. At temperatures above the critical temperature, the material is a normal conductor and is permeable to magnetic flux. At temperatures below the critical temperature, the material is superconducting and impermeable to magnetic flux. However, if the material is subjected to and permeated by a strong magnetic field as the material is cooled past the critical temperature, the magnetic field permeating the superconductor will be trapped or frozen, thereby acting as a permanent magnet. As long as the temperature does not exceed the critical temperature, the magnetic orientation will be frozen within the superconducting material.

As may be readily appreciated, a magnetized rotor assembly of this type will not be limited by the same physical properties which limit permanent magnets. The rotor assembly will be limited by the material specific critical temperature Tc and the critical magnetic flux Bc. As materials with higher values of Tc and Bc become available, the magnetic energy product of the rotor assembly of the present invention will increase.

In order to make maximum use of the potentially very high magnetic energy product of the rotor assembly of the present invention, the stator assembly of the dynamoelectric machine is preferably configured as described within the applicant's co-pending application, U.S. Ser. No. 07/217,729 filed July 7, 1988.

Accordingly, it is an object of the present invention to define a new dynamoelectric machine having a freezable magnetic field rotor assembly and method of magnetizing the rotor assembly.

DESCRIPTION OF THE DRAWINGS

These and other objects and advantages of the invention will become apparent from the following detailed description taken in conjunction with the appended figures, wherein:

FIG. 4 depicts a simplified wiring diagram for the three phase winding of the stator assembly.

FIGS. 5 and 6 are schematic diagrams of the magnetic field surrounding the machines rotor assembly for a rotor in free space and a rotor surrounded by a diamagnetic flux shield.

BEST MODE OF CARRYING OUT THE INVENTION

Figure 1:
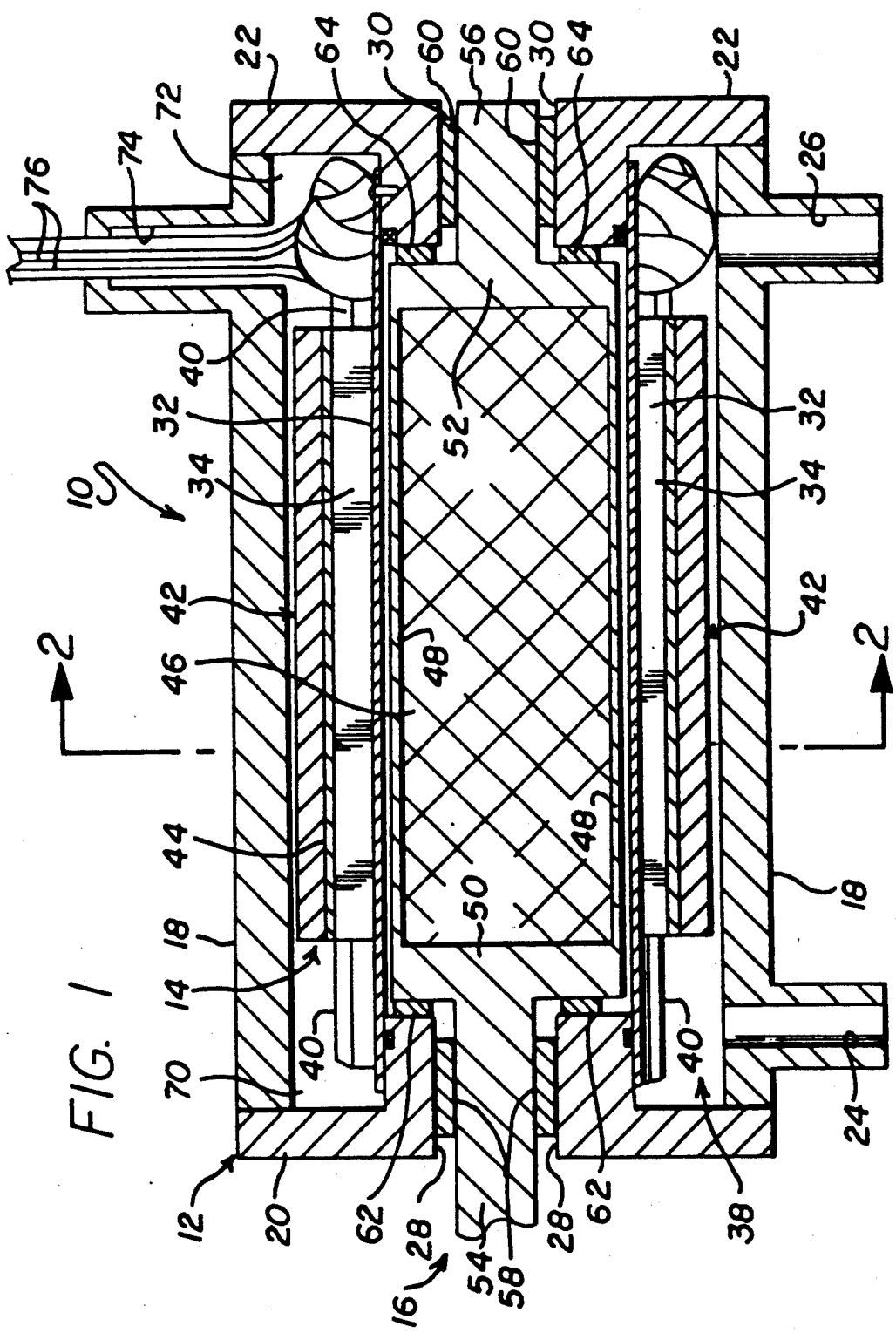
FIG. 1 is a cross-sectional view of a dynamoelectric machine constructed according to the teachings of the present invention.
Figure 2:
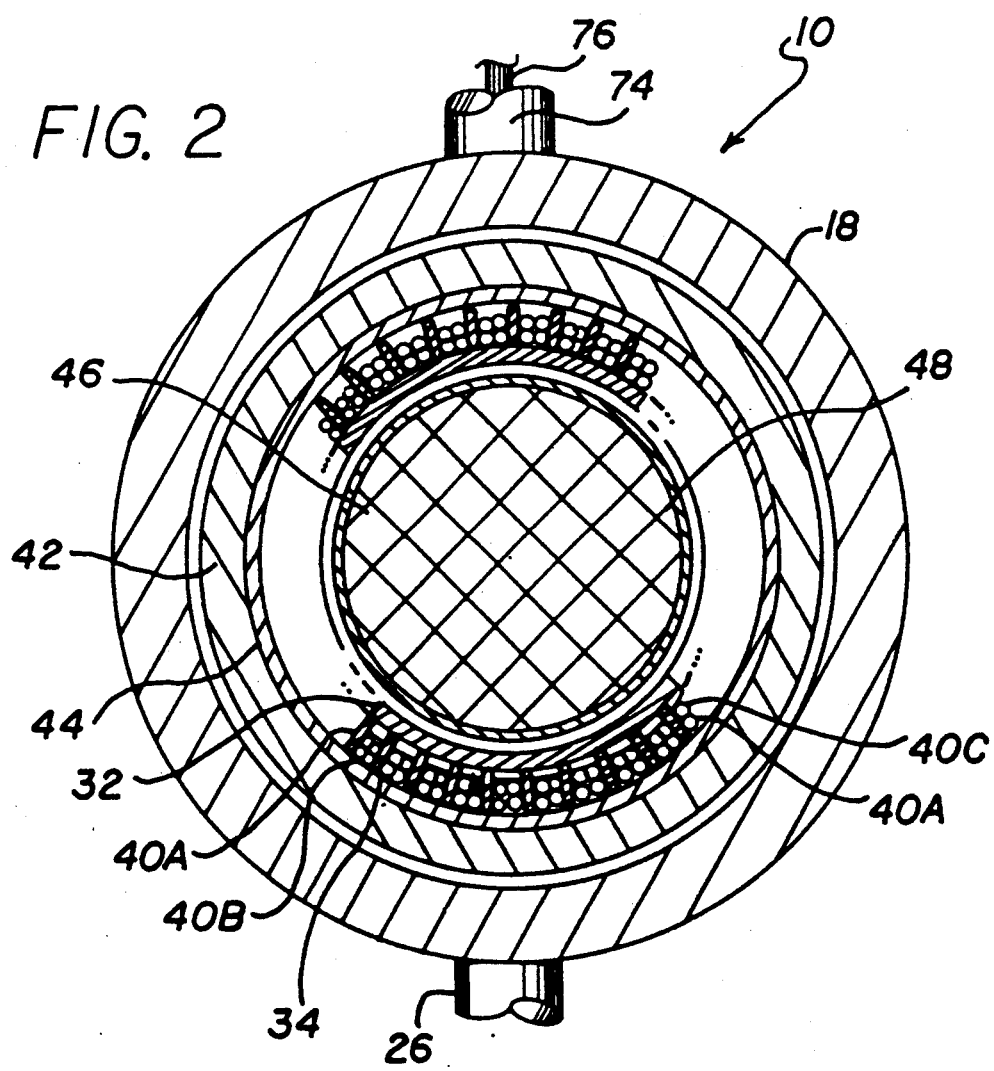
FIG. 2 is a cross-sectional view along the line 2—2 of FIG. 1.

An example of a preferred embodiment of the invention will be described with reference to FIGS. 1 and 2 wherein FIG. 1 depicts a cutaway view of a dynamoelectric machine 10 of the present invention and FIG. 2 shows a cross-sectional view of the machine 10 along the line 2—2 of FIG. 1. The machine 10 includes a housing assembly 12 which contains therein a stator assembly 14 and a rotor assembly 16. The housing assembly 12 is made up of three parts, a generally cylindrical central housing section 18, and first and second end bells 20, 22 respectively, which are attached to opposite ends of central housing section 18. The central housing section 18 additionally has a refrigerant inlet port 24 located near one end and a refrigerant outlet port 26 located near an opposite end. The end bells 20, each have cylindrical bearing support area 28, 30 which project axially a short distance toward the center of the machine 10.

The stator assembly 14 includes a cylindrical winding support structure 32 having a plurality of radially outwardly extending, axially aligned support fins 34 which define a plurality of winding slots 36 therebetween. The winding support structure 32, is adapted so as to be mounted over portions of the cylindrical bearing support areas 28 and 30 of end bells 20, 22. Thus, the housing assembly 12 and the winding support structure 32 combine to define a generally cylindrically shaped pressure cavity 38 wherein the stator assembly 14 is located. The stator assembly 14 further includes a plurality of stator windings 40, which are adapted to have sections thereof placed within the winding slots 36 of winding support structure 32. For a three-phase electrical machine, there will be three sets of stator windings 40 A, B, and C, more phases may be accommodated by the addition of added stator windings. Stator assembly 14 also includes a cylindrical diamagnetic flux shield 42, formed for example from metal oxide based ceramic superconducting compounds such as $Y Ba_2 Cu_3 O_{7-x}$, which is mounted about the outer periphery of the support fins 34 of winding support structure 32, and separated from the stator windings 40 by a non-magnetic insulating spacer 44. Alternatively, a ferromagnetic flux core may replace the flux shield 42 within the machine 10.

The rotor assembly 16 is mounted internally to the stator assembly 14, and is depicted as including a cylindrical superconducting magnet 46 contained within a cylindrical retaining sleeve 48 and having a first end piece 50 and a second end piece 52 fixedly attached to the ends of the cylindrical retaining sleeve 48. Projecting from the first end piece 50 is a power coupling shaft 54, while a support shaft 56 projects from the second end piece 52. Power coupling shaft 54 projects through the cylindrical bearing support area 28 of first end bell 20 and is axially supported by bearing 58 mounted there within. Support shaft 56 similarly projects into the cylindrical bearing support area 30 of the second end bell 22 and is axially supported by bearing 60 mounted therewithin. Thrust bearings 62 and 64 may be required to be located between the end pieces 50, 52 of rotor assembly 16 and bearing support areas 28, 30 of end bells 20, 22.

It should be noted that the support fins 38 are configured so as to extend along the winding support structure 36 only for the length of the superconducting magnet 46 of rotor assembly 16, while the cylindrical portion of winding support structure 36 is approximately as long as the central housing section 18. At each end of the machine 10, there are defined toroidal cavities identified as inlet manifold 70 and outlet manifold 72. Within the manifolds 70 and 72 are located the end turn sections of stator windings 40. An aperture 74 within the central housing section 18 is used to bring winding leads 76 into the machine 10, which aperture 74 is sealed to prevent refrigerant leaks. The refrigerant inlet port 24 is configured to deliver refrigerant into the inlet manifold 70 wherein the refrigerant is distributed around the circumference of the machine in intimate contact with the stator windings 40. The refrigerant flows axially through the winding slots 36, cooling the stator windings 40 as well as the flux shield 42. Upon exiting the winding slots 36, the refrigerant flows into outlet manifold 72 and is allowed to escape through refrigerant outlet port 26. This arrangement is ideal for providing cooling for the stator windings 40 and flux shield 42.

Figure 3:
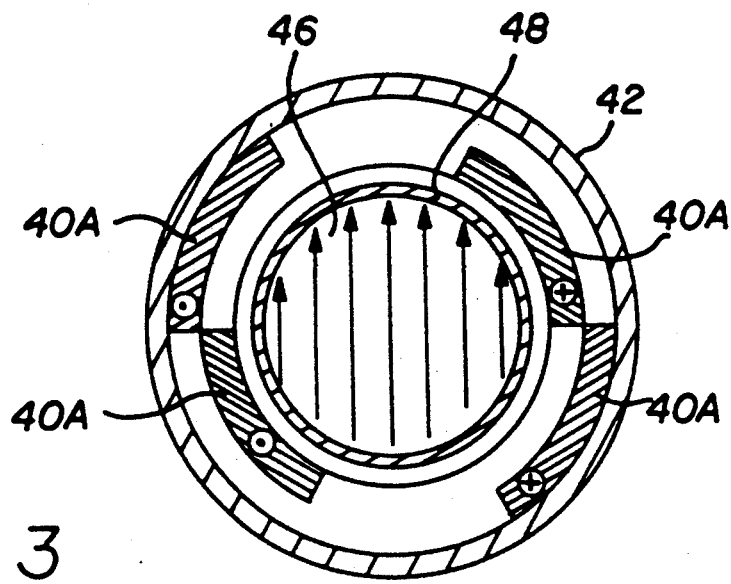
FIG. 3 schematically depicts a simplified cross-section of the dynamoelectric machine during magnetizing of the superconducting magnet.

FIG. 3 depicts a simplified cross-sectional view similar to FIG. 2, wherein only the superconducting magnet 46, retaining sleeve 48, flux shield 42, and one stator winding 40A are depicted. FIG. 3 will be primarily used to describe the process of magnetizing the superconducting magnet 46. Initially, it must be understood that while a superconductor is operating at a temperature below its critical temperature within a magnetic field having a field strength below the critical field, strength, the superconductor is diamagnetic and therefore impermeable to magnetic flux. Alternatively, a material which is superconducting below the critical temperature is a normal conductor at temperatures greater than the critical temperature, and it is also magnetically permeable. Finally, superconducting material which is permeated by a strong magnetic field while at a temperature above the critical temperature, which material is then cooled to below the critical temperature while the magnetic field is maintained, will effectively freeze the magnetic field within itself becoming a magnet for as long the temperature remains below the critical temperature. This phenomenon is utilized to magnetize the superconducting magnet 46 of the machine 10.

Within the machine 10, a refrigerant is circulated through the pressure cavity 38, cooling the stator windings 40 and flux shield 42. In a machine incorporating superconductors for the stator windings 40 and/or for the flux shield 42, the refrigerant cools the superconductor to a temperature below its critical temperature. It must be emphasized that at this point the rotor assembly 16, and more particularly the superconducting material 46 are at a temperature greater than the critical temperature. Next, the rotor assembly 16 is fixedly held with respect to the stator assembly 14 while one of the stator windings is energized by a strong direct current.

The stator winding 40A, shown schematically, represents a winding for a three phase, two pole, single turn, conventional layer wound stator. Each stator winding 40 has two pole phase groups, the centers of which are spaced 180 degrees apart. Thus, the windings at the top half of the figure are one pole phase group, and the windings at the bottom half are the second pole phase group for stator winding 40A. When the stator winding 40A is energized with a direct current (DC), the current flows into the plane of the paper for the conductors on the right side, and out of the plane of the paper for the conductors on the left side. This energizing current establishes a magnetic field permeating the rotor assembly 16, in other words, a diametrically magnetizing field.

This diametrically aligned magnetic field is maintained as the rotor assembly 16, and more particularly the superconducting magnet 46 are cooled to a temperature below the critical temperature for the superconducting material. Cooling of the rotor assembly 16 is preferably accomplished by maintaining a flow of refrigerant through the stator windings 40 and pressure cavity 38 of the stator assembly 14. Thereby convection heating from the rotor assembly is removed by the refrigerant. As the superconducting magnet 46 is cooled through the critical temperature, the magnetic field is captured or frozen, diametrically magnetizing the superconductor. Presumably, electric currents are established within the superconducting material to support the magnetic field surrounding the magnet when the DC excitation of the stator winding 40A is terminated. Thereby, the superconducting magnet 46 maintains a magnetic field surrounding itself which is identical to, though potentially much stronger than, the field surrounding a conventional magnet.

After magnetization of the superconductor 46 by the above process, the magnetic field will be maintained as long as the critical temperature is not exceeded. Thus the rotor assembly 16 is now ready to operate within the dynamoelectric machine 10 in either a motor or generator mode.

The effect that the flux shield 42 has upon the magnetic field surrounding the conducting magnet 46 can best be understood with reference to FIGS. 5 and 6. FIGS. 5 and 6 show schematic views of a cross-section of the cylindrical superconducting magnet 46 which is diametrically magnetized, the magnetic field represented by magnetic lines of force 78 produced by the magnet 46, and the bottling effect that the flux shield 42 has on the magnetic field. FIG. 5 depicts the magnetic field which surrounds a cylindrical superconducting magnet as it would exist in free space. The magnetic lines of force 78 prescribe generally elliptical paths of increasing size. FIG. 6 depicts the effect that the magnetic flux shield 42 has on the magnetic field surrounding the superconducting magnet 46. The diamagnetic property of the flux shield 42 does not allow for penetration of the magnetic flux and thus the flux shield compresses the magnetic field surrounding the magnet 46 into the cylindrical space 80 between the inner diameter of flux shield 42 and the outer diameter of superconducting magnet 46. As the superconducting magnet 46 is caused to rotate with the rotor assembly 16 of FIG. 1, the magnetic field will also rotate within the cylindrical space 80 resulting in a time varying magnetic field at any given point therein. Thus, when the stator windings 40 are placed within the cylindrical space 80, they will be subjected to the time varying magnetic field.

When the dynamoelectric machine 10 is operating as a generator, mechanical shaft power is provided via power coupling shaft 54 to cause the rotor assembly 16 to rotate. The two pole superconducting magnet 46 and its surrounding magnetic field thus also rotate producing a potential in stator windings 40 which may be connected to a power consuming device (not shown) external to the machine 10. Conversely, when the machine 10 is operating as a motor, current is supplied sequentially to stator windings 40 which themselves then produce a magnetic field to react with the magnetic field of rotor assembly 16 to drive the rotor assembly 16 and yield a mechanical output via power coupling shaft 54.

The stator windings 40 of the machine 10 will be required to carry relatively high current densities within a high magnetic flux environment. Thus, it is desirable to use multiple thin strands of either copper or aluminum wire, bundled in a fully transposed "Litz" configuration.

As an alternative to the copper or aluminum wires for the stator windings 40, wires made from metal oxide and ceramic superconducting compounds such as $Y Ba_2 Cu_3 O_{7-x}$ may also be used within the dynamoelectric machine 10. In the event that superconducting wires are used, it may be appreciated that the diamagnetic property of the material will not allow magnetic flux penetration. Thus, the magnetic flux will be forced to go around the stator windings 40 and will effectively progress radially outward along the support fins 34. Upon reaching the proximity of the flux shield 42, the magnetic flux will turn and be concentrated close to the interior wall within insulator 44 of flux shield 42 until reaching the opposite magnetic pole of the superconducting magnet 46 at which time the flux will turn and progress radially inwardly along another support fin 34, thus completing the magnetic path and providing the necessary linking of stator windings 40.

While the rotor assembly has been described as cooperating with an ideally configured stator assembly, it may be appreciated that the rotor assembly is capable of operating with any type of stator. This and other modifications of the invention will become apparent to those skilled in the art. Accordingly, it is to be understood that within the scope of the appended claims the invention may be practiced otherwise than is specifically described.

I claim:

1. A method of magnetizing a superconducting rotor for a dynamoelectric machine comprising the steps of:
   providing a rotor assembly having a superconductor contained within a non-magnetic, high strength retaining sleeve;
   installing said rotor assembly within said stator assembly whereby said stator winding is disposed about said rotor assembly;
   securing said rotor assembly with respect to said stator assembly in a fixed angular position;
   energizing one of said stator windings with a direct current to produce a magnetic field permeating said rotor assembly;
   cooling said rotor assembly including said superconductor to a temperature below the critical temperature of said superconductor simultaneously with said energizing step to freeze said magnetic field therein;
   de-energizing said stator winding; and
   releasing the angular position of said rotor assembly with respect to said rotor assembly.

2. The method of claim 1 wherein said providing step further comprises:
   forming a superconducting material into the shape of a solid cylinder; and
   mounting said cylindrical superconductor within a cylindrical retaining sleeve of high strength, non-magnetic material.

3. The method of claim 1, wherein said cooling step further comprises:
   circulating a refrigerant through said stator assembly to cool said rotor assembly.

4. The method of claim 1, wherein the step of providing said stator assembly further comprises:
   designing said stator assembly to include a refrigerant inlet, a refrigerant outlet, and a pressure chamber within which the stator windings are mounted.

5. The method of claim 4, wherein said cooling step further comprise:
   circulating a refrigerant through said stator assembly.

6. The method of claim 1, wherein the step of providing said stator assembly further comprises:
   forming said at least one stator winding from superconducting material.

7. The method of claim 6, further comprising:
   cooling said at least one superconducting stator winding to a temperature below the superconductor critical temperature prior to energizing said stator winding with a direct current.

8. The method of claim 1, wherein the step of providing said stator assembly further comprises:
   mounting a superconducting flux shield about said at least one stator winding within said stator assembly.

9. The method of claim 6, further comprising:
   cooling said superconducting flux shield to a temperature below the superconductor critical temperature prior to energizing said stator winding with a direct current.

10. The method of claim 1, wherein the step of providing said stator assembly further comprises:
    forming said at least one stator winding from superconducting material;
    mounting a superconducting flux shield about said at least one superconducting stator winding within said stator assembly; and
    cooling said at least one superconducting stator winding and said superconducting flux shield to a temperature below the superconductor critical temperature prior to energizing said stator winding with a direct current.

* * * * *